Figure 7:
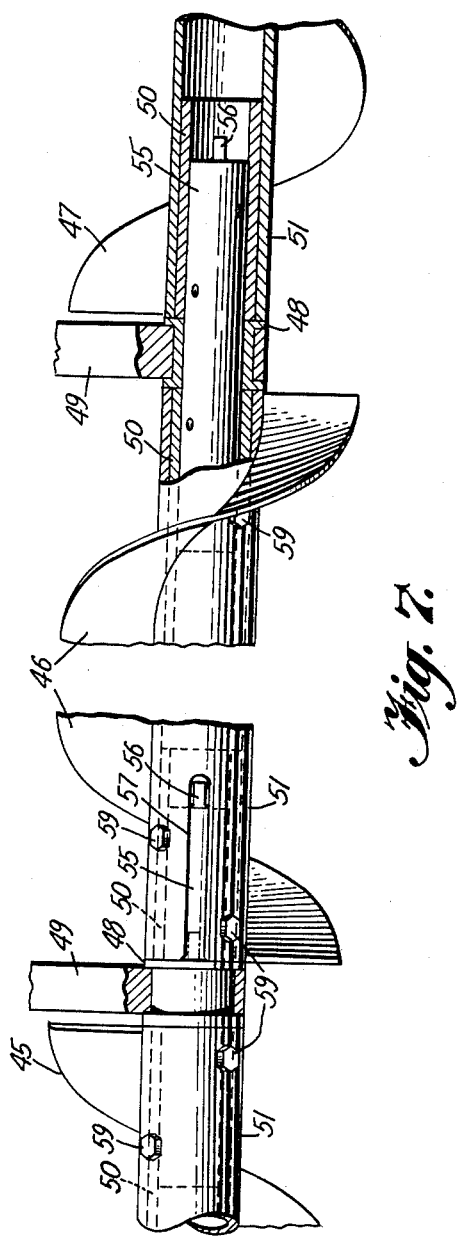

Jan. 8, 1963  D. A. DAVIS  3,072,243
SCREW CONVEYOR COUPLING
Filed June 9, 1959
2 Sheets-Sheet 1
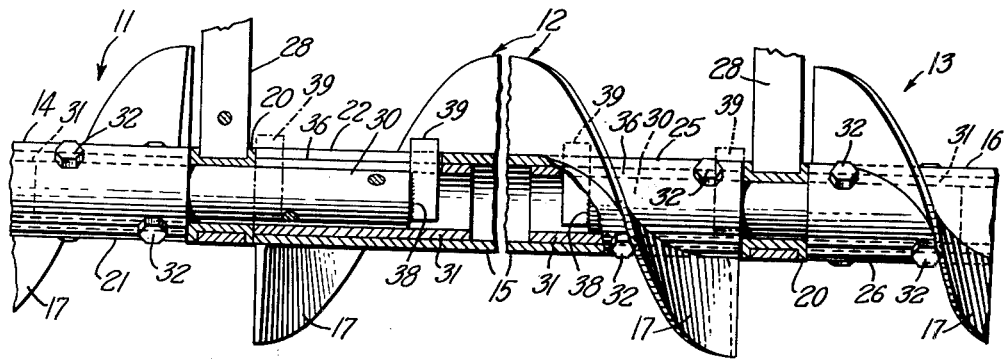
Fig. 1.
Fig. 2.
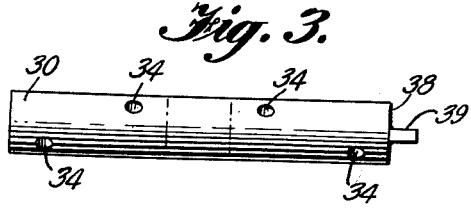
Fig. 3.   Fig. 4.
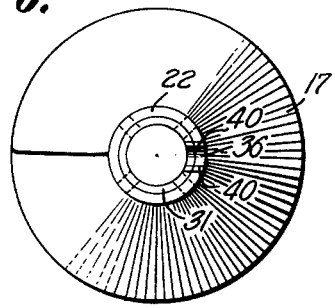
Fig. 6.   Fig. 5.

United States Patent Office 3,072,243
Patented Jan. 8, 1963

3,072,243
SCREW CONVEYOR COUPLING
David A. Davis, Clarendon Hills, Ill., assignor to Link-Belt Company, a corporation of Illinois
Filed June 9, 1959, Ser. No. 819,130
5 Claims. (Cl. 198—213)

This invention relates to screw conveyors, and deals more particularly with a coupling for joining the ends of adjacent screw sections in such a conveyor.

An object of this invention is to provide a coupling for screw conveyor sections which is economical to manufacture and by means of which individual screw sections of a conveyor may be quickly removed and replaced with the use of ordinary tools.

Another object of this invention is to provide a coupling for joining the ends of adjacent screw conveyor sections located on opposite sides of a bearing hanger, the coupling permitting the removal of a single screw section from the conveyor without the need for removing any bearing hangers or other screw sections and without the need for employing split bearings in the hangers.

Another object of this invention is to provide a coupling of the above mentioned character which in use is capable of transmitting a large torque between the joined screw sections so as to maintain a high torque rating for the complete conveyor.

Other objects and advantages of the invention will be apparent during the course of the following description.

In the accompanying drawings forming a part of this specification and in which like numerals are employed to designate like parts throughout the same, FIGURE 1 is a fragmentary, partly elevational and partly sectional view of three screw conveyor sections joined by couplings embodying the present invention, FIGURE 2 is an elevational view of one of the couplings of FIG. 1, shown with the bearing removed, FIGURE 3 is an elevational view of the coupling shaft employed in the structure of FIG. 1, FIGURE 4 is an end view of the coupling shaft of FIG. 3, FIGURE 5 is an elevational view of an end portion of a screw conveyor section of FIG. 1 shown prior to its assembly with a coupling shaft, FIGURE 6 is an end view of the screw section shown in FIG. 5, and FIGURE 7 is a fragmentary, partly elevational and partly sectional view of three screw conveyor sections joined, in an alternative manner to that shown by FIG. 1, by couplings embodying the present invention.

In the drawings, wherein for the purpose of illustration is shown the preferred embodiments of this invention, and first particularly referring to FIG. 1, there are shown three successive sections 11, 12 and 13 of a screw conveyor, each comprising a tubular central shaft 14, 15 and 16, respectively, and a helicoid flight 17 secured to the central shaft for moving material through a trough (not shown) in which the screw sections are located when in operation. The screw sections 11, 12 and 13 are supported by bearings 20, one being located between the adjacent end portions 21 and 22 of the central shafts 14 and 15, respectively, and another being located between the adjacent end portions 25 and 26 of the central shafts 15 and 16, respectively. Each of the bearings 20 is of a solid-eye type and is supported by a bearing hanger 28 depending from the top of the trough.

Each of the two pairs of adjacent end portions 21—22 and 25—26 of the tubular central shafts is joined by a coupling shaft 30 which is positioned within such end portions and which passes through the associated bearing 20. A sleeve liner 31 is secured to the inside of the central shafts at each of the end portions between the coupling shaft and the central shaft to provide extra strength at the end portions, and a sliding fit is maintained between the coupling shaft and the sleeves. Each coupling shaft 30 is connected to its two associated shaft end portions 21—22, or 25—26, by two bolts 32 which pass through the central shaft, the liner sleeve and openings 34, FIG. 3, in the coupling shaft. The two bolts 32 associated with each central shaft end portion are spaced longitudinally of the central shaft and pass diametrically therethrough at right angles to each other.

To permit the removal or replacement of one screw section, without disturbing adjacent screw sections, bearings or bearing hangers, each of the couplings joining a pair of central shaft end portions further includes novel means for removing the coupling shaft 30 from one of the end portions in which it is located.

As seen best in FIG. 2, at least one of the central shaft end portions, in this case the end portion 22, forming a coupled pair is provided with a slot 36 which extends radially through the walls of the central shaft 15 and the liner 31 and longitudinally of the central shaft from the end surface 37 to a point some distance beyond the end wall 38 of the coupling shaft 30 when the latter is in its normal coupled position. Formed on the end wall 38 of the coupling shaft 30 is a lug 39 which extends axially and radially, see FIG. 4, of the coupling shaft and radially outwardly through the slot 36 for some distance beyond the outer surface of the central shaft 15, see FIG. 1. The thickness of the entire lug 39 is less than the distance between the opposed surfaces 40 defining the slot 36 so that the lug 39 can pass through the slot 36 when the coupling shaft 30 is moved either longitudinally or radially of the central shaft end portion 22.

As shown in FIG. 1, the couplings of the present invention are so arranged that the middle screw section 12 has slots 36 formed in both of the end portions 22—25 of its central shaft 15, while the adjacent end portions 21—26 of the screw sections 11 and 13 are unslotted. Although only three conveyor sections are shown in FIG. 1, it is intended that this same arrangement of couplings would be repeatedly followed in a conveyor having more than the three sections shown. In this case it is evident that every other section of the conveyor would have both of its end portions provided with slots 36 and that the remaining intermediate sections would have neither of their end portions slotted.

The operation of the invention as applied to a screw conveyor having a number of sections joined as shown in FIG. 1 may now be described as follows:

In the normal operation of the screw conveyor, the screw sections 11, 12 and 13 are joined by the coupling shafts 30 positioned in and between the adjacent central shaft end portions 21—22, and 25—26, and by the bolts 32 which prevent both rotational and longitudinal movement of the coupling shafts relative to the central shafts. Thus, rotation of the screw section 11 will cause rotation of the screw sections 12 and 13 through the coupling shafts 30.

Assume now that one of the screw sections having both of its ends slotted, such as the screw section 12, is to be removed from the conveyor. This is accomplished by removing all of the bolts 32 from the central shaft end portions 21—22 and 25—26 and turning the screw sections until the lugs 39 of the coupling shafts 30 are brought to approximately the upwardly directed positions illustrated in FIG. 1. The coupling shafts 30 are then moved longitudinally of the central shafts by sliding the lugs 39 along the slots 36 until the lugs engage the bearings 20, as shown by the dashed lines in FIGS. 1 and 2. This can be done by applying force to the parts of the lugs protruding from the slots. It will be readily apparent that with the lugs 39 in these new positions, the end wall 38 of each coupling shaft will be located even with the end surface 37 of its associated slotted end portion of the screw section.

To complete the removal of the screw section 12, the latter section is now turned 180° to bring the lugs 39 into a downwardly directed position. After this the section may be lifted upwardly from the conveyor with the end surfaces of the central shaft 15 sliding past the end walls 38 of the coupling shafts and with the lugs 39 passing radially through their associated slots 36 as the section is removed.

To replace the middle screw section 12 after its removal, the above procedure is again followed in its reversed order.

Should it be desired to remove a screw section, such as one of the sections 12 or 13 of FIG. 1, having neither of its ends slotted it will be evident that this can also be accomplished without the necessity of removing any of the bearings or bearing hangers. In this case, the two slotted sections on either side of the unslotted section are removed from the conveyor by the procedure outlined above. The unslotted section can then be easily removed by first using the lugs 39 to pull the two coupling shafts 30 out of the central shaft of the unslotted section. Afterwards the section may be lifted from the conveyor. When replacing the unslotted section it is, of course, apparent that this section will have to be mounted on its associated bearings 20 by the coupling shafts 30, with the lugs 39 of the coupling shafts being pushed into engagement with the bearings, before the slotted sections are installed.

Another way in which the couplings in this invention may be employed to join the successive sections of a screw conveyor is shown in FIG. 7. In this illustration three successive screw sections 45, 46 and 47 are supported in a trough, not shown, by solid eye-type bearings 48 that are mounted between the adjacent ends of the screw sections by bearing hangers 49 depending from the top of the trough. Each of the screw sections has a sleeve liner 50 secured to the inside of its central shaft 51 at each end thereof and the connection between adjacent ends of adjacent sections is accomplished by a coupling shaft 55 similar to the coupling shafts 30 described in connection with FIG. 1. Each of the coupling shafts 55 has a lug 56, welded to one of its ends, which extends outwardly through an axially extending slot 57 in the associated end of a central shaft 51.

In the FIG. 7 arrangement, each of the screw sections of the conveyor has its central shaft slotted at one end and unslotted at the other. Therefore, all of the screw sections of the conveyor are identical and the procedure for removing a section from the conveyor is the same for each section. That is, no two different techniques are required to take out alternate screw sections as is the case for the FIG. 1 arrangement.

To remove a screw section from a screw conveyor coupled as shown in FIG. 7, it is necessary to remove one of the bearing hangers 49 along with the screw section. This, however, is still an improvement over the prior art couplings in which it is normally necessary to take out at least both of the bearing hangers on either side of the section to be removed.

Assuming the middle section 46 of FIG. 7 is to be removed, the procedure followed is to first remove all eight of the bolts 59 passing through the two coupling shafts 55 associated with the section 46. By applying force to the lugs 56, the coupling shafts 55 are then moved to the left, as viewed in FIG. 7, until the lugs are brought into engagement with the bearings 48. The screw sections 46 and 47 are then rotated by hand to bring the lug 56 on the left-hand coupling shaft 55 to a downwardly directed position and the lug 56 on the right-hand coupling shaft 55 to an upwardly directed position. After this the right-hand bearing hanger 49 is removed from the trough, which will then allow the section 46 to be lifted from the conveyor.

During the removal of the section 46, the left-hand coupling shaft 55 remains in the screw section 45 with the lug 56 thereof sliding through the slot 57 on the left-hand end of the section 46. The right-hand coupling shaft 55 remains with the screw section 46 with its lug 56 passing through the slot 57 in a screw section 47 as the section 46 is lifted from the coupling conveyor. The bearing hanger 49 and the associated bearing 48 at the right-hand end of the section 46 are, of course, also lifted from the conveyor with the section 46. To replace the screw section 46, the above procedure is followed in its reversed order.

It is to be understood that the forms of this invention herewith shown and described are to be taken as the preferred examples of the same and that various changes in the shape, size and arrangement of parts may be resorted to without departing from the spirit of the invention or the scope of the subjoined claims.

Having thus described the invention, I claim:

1. A screw conveyor comprising, two adjacent screw sections each having a hollow central shaft, a bearing between the adjacent ends of each of said two shafts, a coupling shaft positioned within and extending between the hollow end portions of said adjacent shafts and passing through said bearing, and removable means for securing each hollow shaft end portion to said coupling shaft against rotation and relative axial movement, one of said hollow shaft end portions having an open-ended longitudinal slot formed therein, and said coupling shaft having secured to one of its end surfaces a lug which extends radially through said slot and beyond the outer surface of said shaft end portion for moving said coupling shaft longitudinally beyond the slotted end portion of said one shaft when said securing means are removed.

2. A screw conveyor comprising, three aligned screw sections each having a hollow central shaft, a bearing located betwen each pair of adjacent end portions of said hollow shafts, a coupling shaft for each pair of adjacent end portions of said hollow shafts, each of said coupling shafts being positioned within and extending between the pair of hollow shaft end portions associated therewith and being journaled in the bearing associated with said end portions, and removable means for securing each coupling shaft to each of the two shaft end portions associated therewith to prevent relative rotational and axial movement between the coupling shaft and its associated shaft end portions, the middle one of said screw sections having an open-ended longitudinal slot formed in each of the hollow end portions of its central shaft and extending through the wall thereof, and each of said coupling shafts having secured to its inner end surface a radial lug which extends through the slot in the end portion of the middle screw section associated therewith and beyond the outer surface of the latter for moving said coupling shaft longitudinally beyond the slotted end portion of its associated shaft when said securing means are removed.

3. A screw conveyor comprising a series of screw sections positioned successively along a longitudinal axis, each of said sections including a central shaft having hollow end portions, one end portion of each pair of adjacent end portions having an open-ended longitudinal slot therein, a bearing between each pair of adjacent end portions, a coupling shaft for joining each pair of adjacent end portions, each of said coupling shafts being positioned within its associated pair of end portions and passing in journaled relationship through the bearing located therebetween, a lug mounted on one end of each of said coupling shafts to extend radially outwardly through the slot provided in one of the end portions of the pair of end portions associated with the coupling shaft for moving the latter longitudinally into and completely out of said one end portion, and removable means for detachably securing each coupling shaft to its associated pair of end portions.

4. The combination as defined in claim 3 further characterized by every other screw section in said series having a slot provided in each of its central shaft end portions with the remaining screw sections having neither of their central shaft end portions slotted.

5. The combination as defined in claim 3 further characterized by each of the screw sections in said series having a slot provided in one of its central shaft end portions and having its other central shaft end portion unslotted.

References Cited in the file of this patent

UNITED STATES PATENTS

| | | |
|---|---|---|
| 270,972 | Newbold | Jan. 23, 1883 |
| 1,158,844 | Price | Nov. 2, 1915 |
| 1,829,453 | Parker | Oct. 27, 1931 |